(12) United States Patent
Goto

(10) Patent No.: US 12,185,033 B2
(45) Date of Patent: Dec. 31, 2024

(54) DISPLAY METHOD, DISPLAY SYSTEM, AND DISPLAY APPARATUS

(71) Applicant: SEIKO EPSON CORPORATION, Tokyo (JP)

(72) Inventor: Kiichiro Goto, Oita (JP)

(73) Assignee: SEIKO EPSON CORPORATION, Tokyo (JP)

( * ) Notice: Subject to any disclaimer, the term of this patent is extended or adjusted under 35 U.S.C. 154(b) by 27 days.

(21) Appl. No.: 17/888,689

(22) Filed: Aug. 16, 2022

(65) Prior Publication Data

US 2023/0056656 A1 Feb. 23, 2023

(30) Foreign Application Priority Data

Aug. 17, 2021 (JP) .................. 2021-132666

(51) Int. Cl.
 *H04N 9/31* (2006.01)
(52) U.S. Cl.
 CPC ......... *H04N 9/3194* (2013.01); *H04N 9/3147* (2013.01); *H04N 9/3182* (2013.01); *H04N 9/3185* (2013.01)
(58) Field of Classification Search
 CPC .. H04N 9/3194; H04N 9/3147; H04N 9/3182; H04N 9/3185; H04N 9/3155; H04N 9/3179; G03B 21/2053; G06F 3/048–04897
 See application file for complete search history.

(56) References Cited

U.S. PATENT DOCUMENTS

| | | | | |
|---|---|---|---|---|
| 5,471,295 A | * | 11/1995 | Hirotsune | G01B 11/26 356/138 |
| 2009/0257031 A1 | * | 10/2009 | Carroll | G03B 37/04 353/30 |
| 2014/0111536 A1 | * | 4/2014 | Shinozaki | G03B 21/147 353/30 |
| 2014/0354784 A1 | * | 12/2014 | Park | G06T 7/55 348/50 |
| 2018/0014008 A1 | * | 1/2018 | Sugiura | G03B 21/142 |
| 2019/0087946 A1 | * | 3/2019 | Chiba | G03B 21/147 |

FOREIGN PATENT DOCUMENTS

| | | |
|---|---|---|
| CN | 113014896 A | 6/2021 |
| JP | 2003-324669 A | 11/2003 |
| JP | 2005-338210 A | 12/2005 |
| JP | 2010-066584 A | 3/2010 |

* cited by examiner

*Primary Examiner* — John W Miller
*Assistant Examiner* — Humam M Satti
(74) *Attorney, Agent, or Firm* — Oliff PLC

(57) ABSTRACT

A display method includes generating first angle information representing an installation angle of a first display apparatus based on a detection value of a sensor provided in the first display apparatus, generating second angle information representing an installation angle of a second display apparatus based on a detection value of a sensor provided in the second display apparatus, and reporting information representing a difference between the installation angle of the first display apparatus represented by the first angle information and the installation angle of the second display apparatus represented by the second angle information by the second display apparatus.

8 Claims, 9 Drawing Sheets

FIG. 4
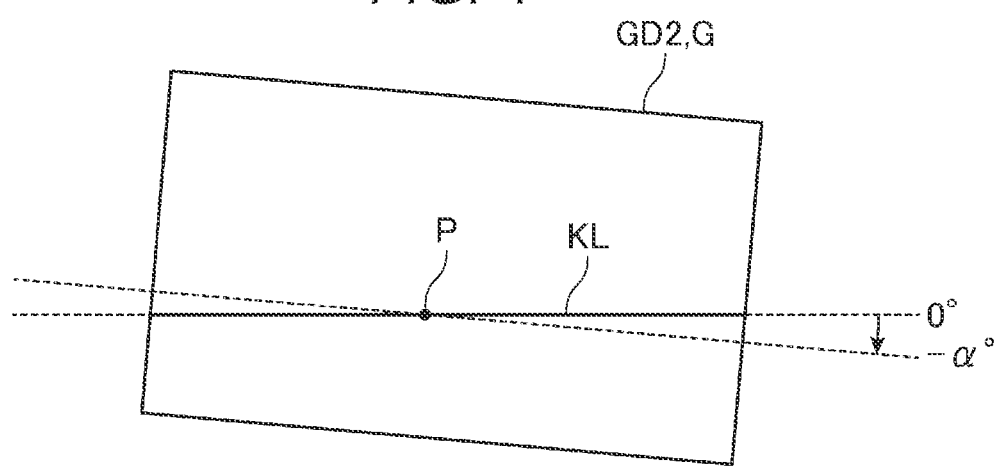
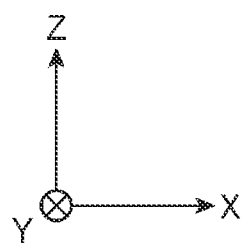

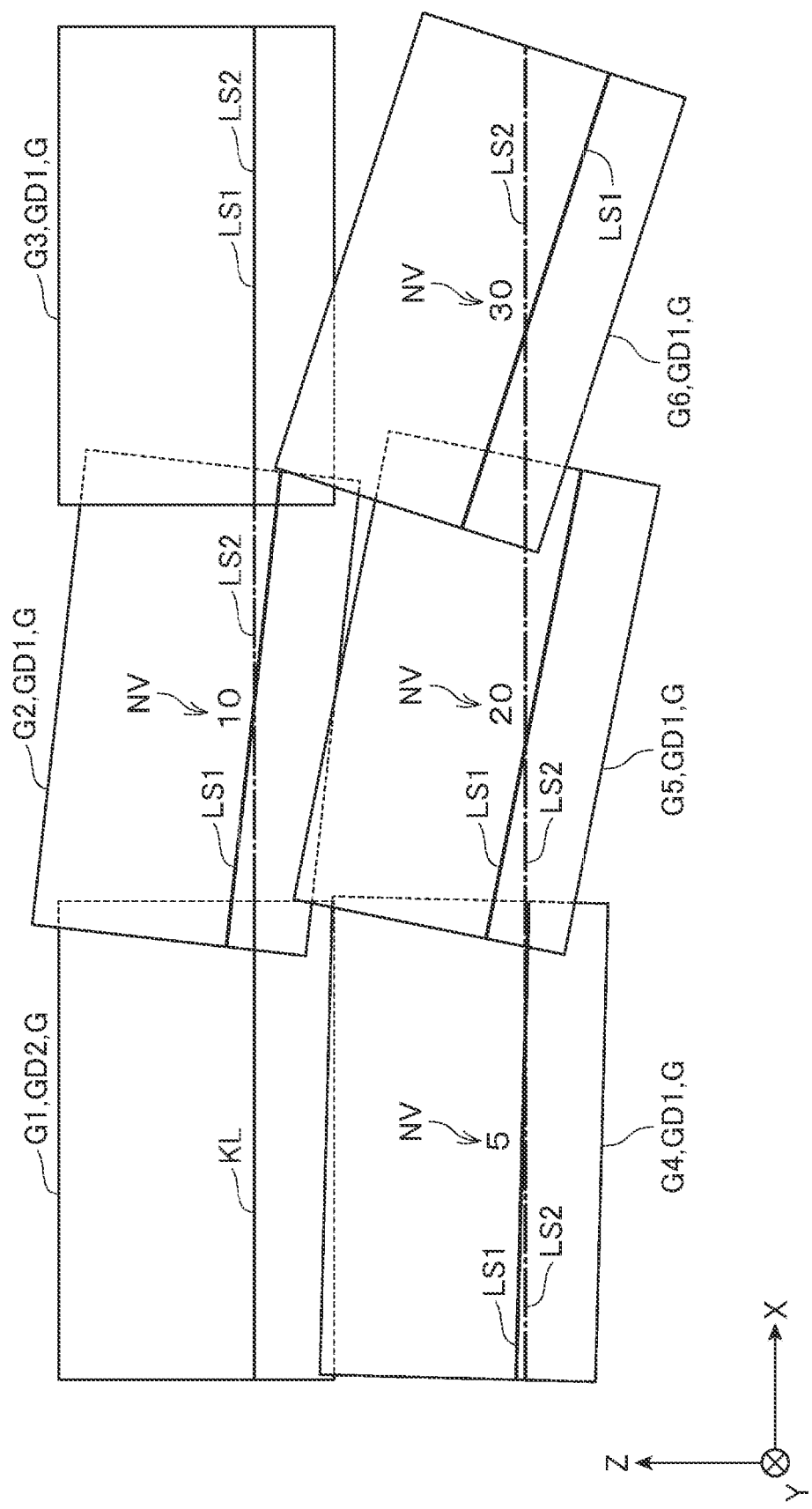

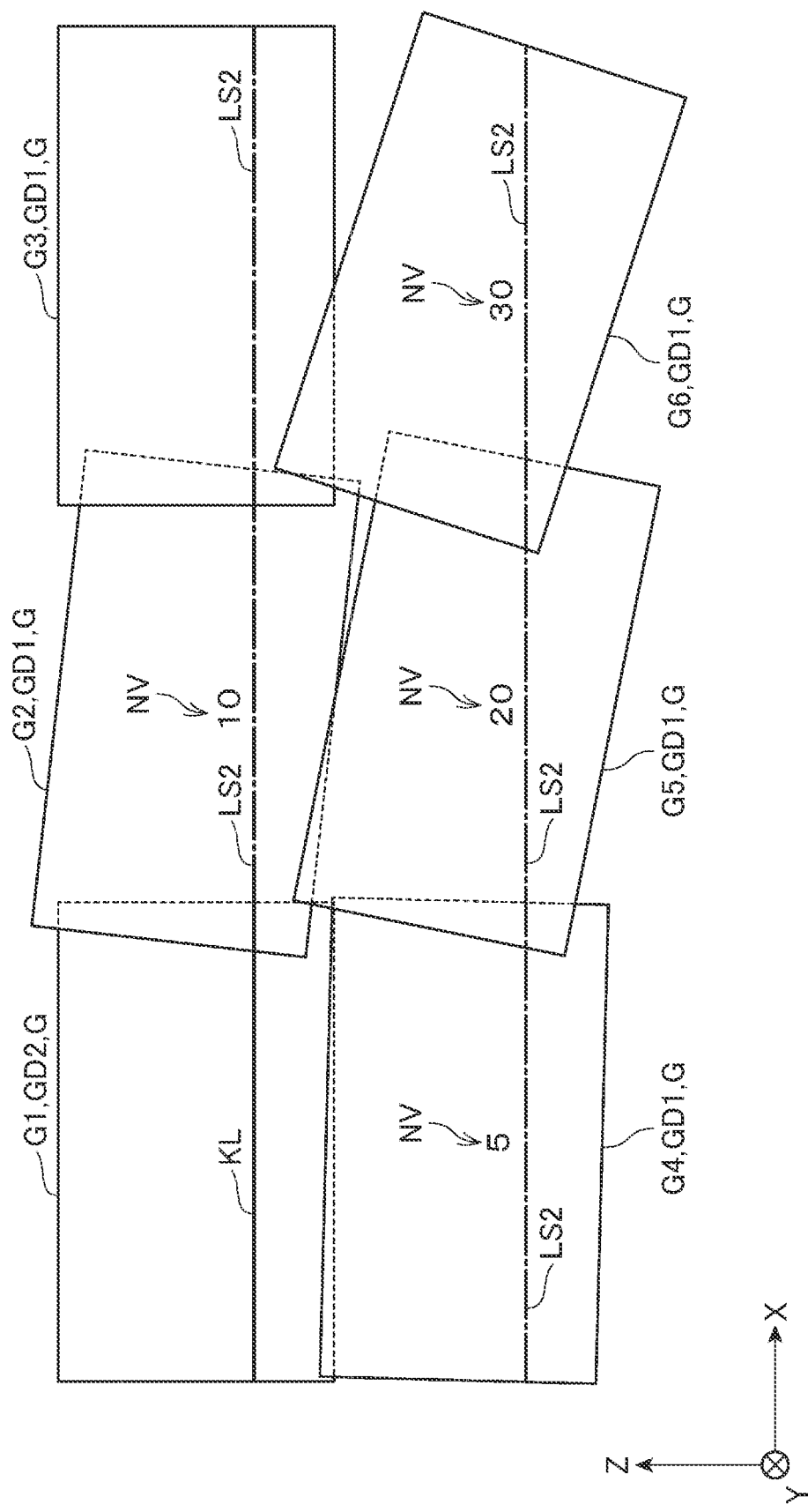

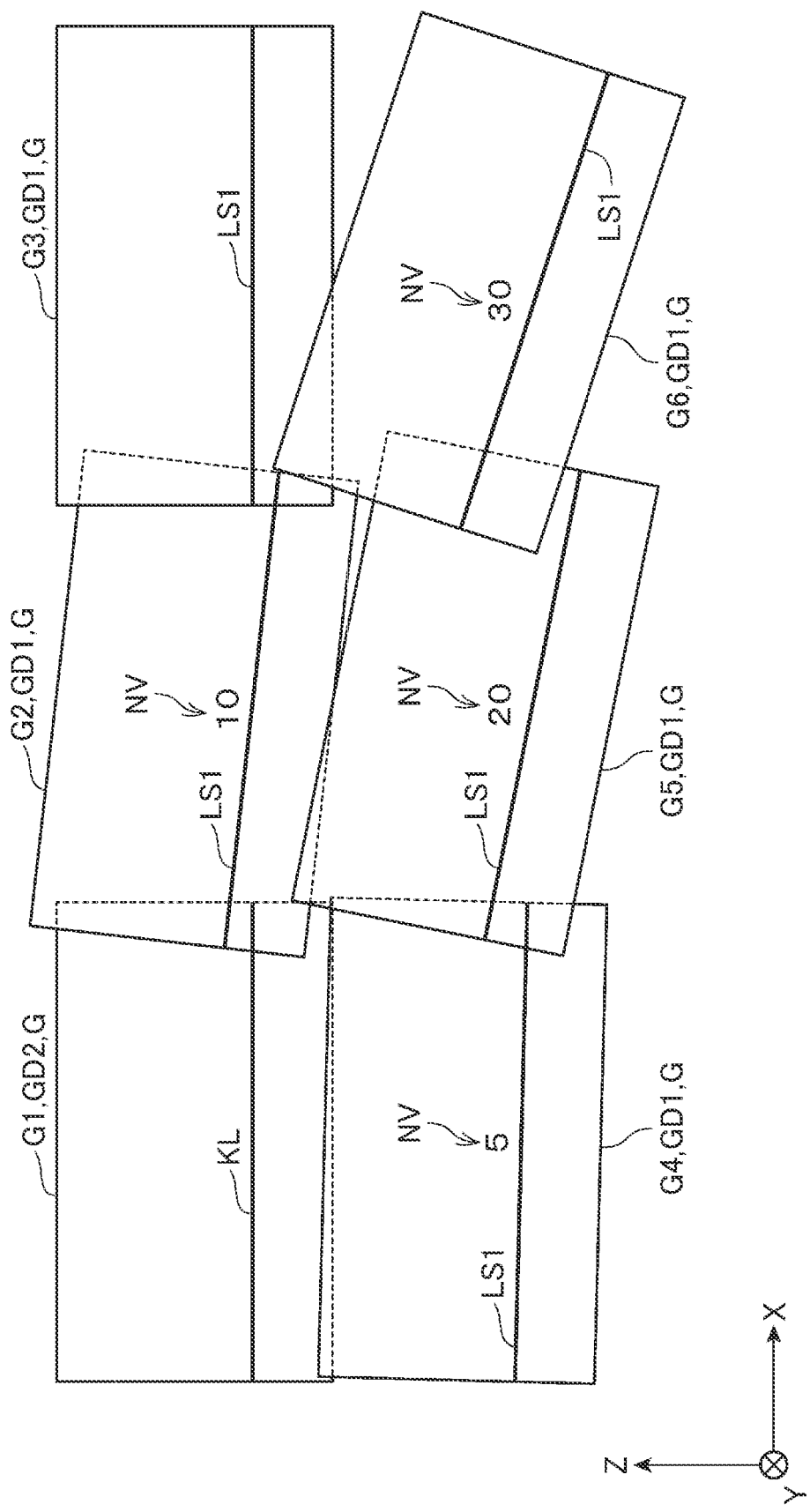

DISPLAY METHOD, DISPLAY SYSTEM, AND DISPLAY APPARATUS

The present application is based on, and claims priority from JP Application Serial Number 2021-132666, filed Aug. 17, 2021, the disclosure of which is hereby incorporated by reference herein in its entirety.

BACKGROUND

1. Technical Field

The present disclosure relates to a display method, a display system, and a display apparatus.

2. Related Art

In related art, a technique relating to installation of a display apparatus including a projector is known. JP-A-2010-066584 discloses a technique of designating an installation angle by a user when the user wishes to install a projector at a desired installation angle and reporting whether or not a detection angle of a tilt sensor of the projector and the installation angle designated by the user are equal.

However, when a plurality of projectors are installed at arbitrary equal installation angles, the technique of JP-A-2010-066584 requires the user to input the installation angles to the respective projectors and adjustment of the installation angles of the projectors may be complex, and the adjustment is not easily made.

SUMMARY

An aspect of the present disclosure is directed to a display method including generating first angle information representing an installation angle of a first display apparatus based on a detection value of a sensor provided in the first display apparatus by the first display apparatus, generating second angle information representing an installation angle of a second display apparatus based on a detection value of a sensor provided in the second display apparatus by the second display apparatus, and reporting information representing a difference between the installation angle of the first display apparatus represented by the first angle information acquired from the first display apparatus and the installation angle of the second display apparatus represented by the second angle information by the second display apparatus.

Another aspect of the present disclosure is directed to a display system including a first display apparatus, and a second display apparatus, wherein the first display apparatus generates first angle information representing an installation angle of the first display apparatus based on a detection value of a sensor provided in the first display apparatus, the second display apparatus generates second angle information representing an installation angle of the second display apparatus based on a detection value of a sensor provided in the second display apparatus, and the second display apparatus reports information representing a difference between the installation angle of the first display apparatus represented by the first angle information acquired from the first display apparatus and the installation angle of the second display apparatus represented by the second angle information.

Yet another aspect of the present disclosure is directed to a display apparatus including a sensor detecting an installation angle of the display apparatus, a generation part generating second angle information representing an installation angle of the display apparatus based on a detection value of the sensor, a receiving part receiving first angle information representing an installation angle of a display apparatus different from the display apparatus, and a reporting unit reporting information representing a difference between the installation angle represented by the first angle information received by the receiving part and the installation angle represented by the second angle information generated by the generation part.

BRIEF DESCRIPTION OF THE DRAWINGS

FIG. 4 shows an example of a second guide image.
FIG. 7 shows examples of images displayed in adjustment of the installation angles of the projectors.
FIG. 8 shows examples of images displayed in adjustment of the installation angles of the projectors.
FIG. 9 shows examples of images displayed in adjustment of the installation angles of the projectors.

DESCRIPTION OF EXEMPLARY EMBODIMENTS

As below, embodiments will be explained with reference to the drawings.

In FIGS. 1, 3, 4, 5, 7, 8, and 9, an X-axis, a Y-axis, and a Z-axis are shown. The X-axis, the Y-axis, and the Z-axis are orthogonal to one another. The Z-axis shows upward and downward directions and vertical directions. The X-axis and the Y-axis are parallel to horizontal directions. The X-axis shows leftward and rightward directions. The Y-axis shows frontward and backward directions. The positive direction of the Z-axis shows the upward direction. The positive direction of the X-axis shows the rightward direction. The positive direction of the Y-axis shows the frontward direction.

First Embodiment

First, a first embodiment will be explained.

Figure 1:
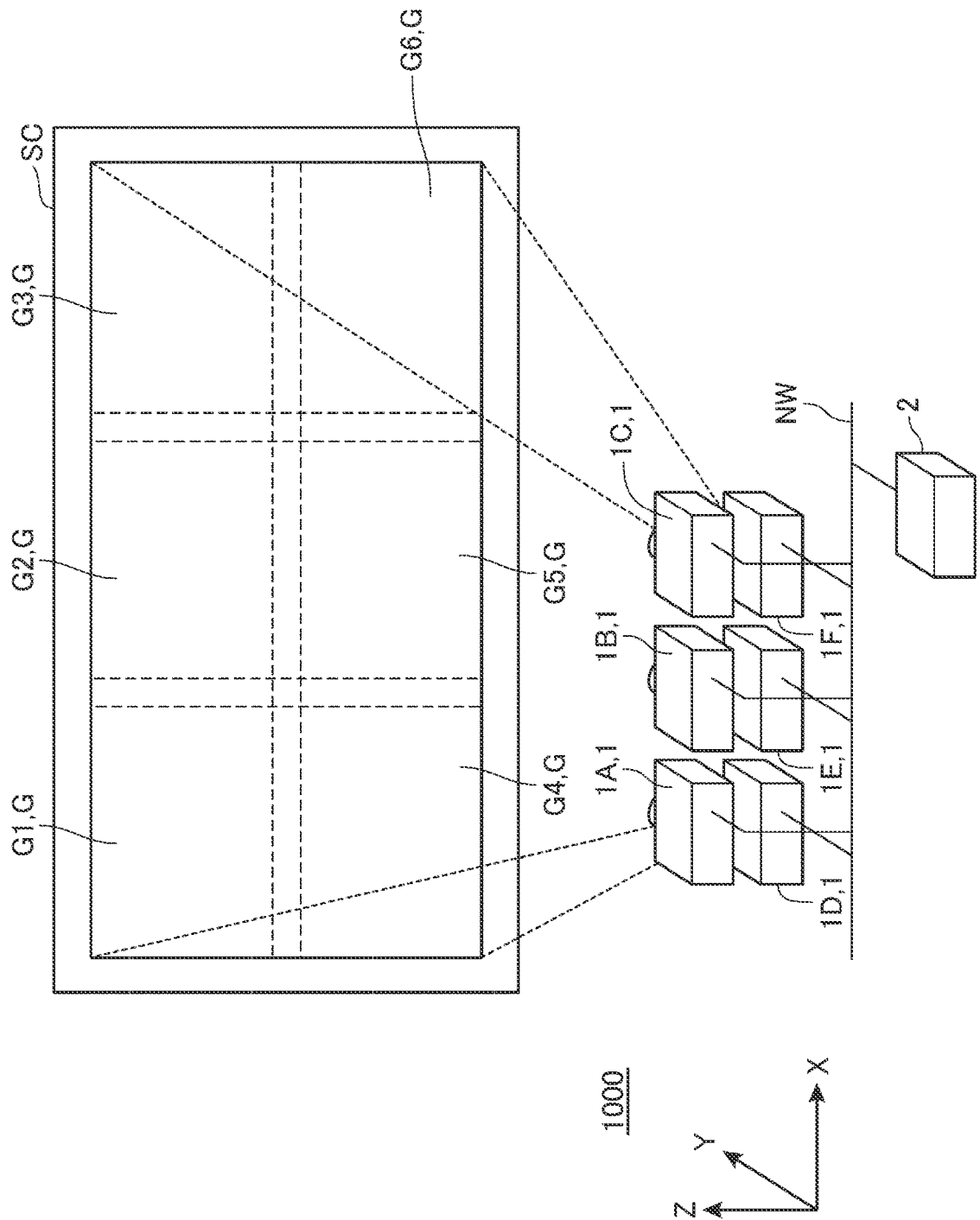
FIG. 1 shows a configuration of a projection system.

FIG. 1 shows a configuration of a projection system 1000. The projection system 1000 is an example of "display system".

The projection system 1000 includes a plurality of projectors 1 arranged and installed. The projection system 1000 performs tiling display of arranging and displaying a plurality of images G by the plurality of projectors 1.

As shown in FIG. 1, the projection system 1000 includes the plurality of projectors 1. The projection system 1000 of the embodiment includes six projectors 1 of projectors 1A, 1B, 1C, 1D, 1E, 1F. The six projectors 1 are installed in longitudinal two rows and lateral three columns.

Note that the number of projectors 1 of the projection system 1000 is not limited to six, but may be two or more. Further, the installation form of the plurality of projectors 1 may be a form in N rows and M columns. Here, N and M are integers equal to or larger than 1.

The projector 1 projects an image light based on image data input from an image supply apparatus 2, and thereby, displays the image G on a screen SC as a projection surface. The screen SC may be a screen in a curtain form or a wall surface of a building or a planar surface of an installation may be used as the screen SC. The screen SC is not limited to a planar surface, but may be a curved surface or a surface having concavities and convexities.

Each of the projectors 1 of the projection system 1000 operates as one of a first projector and a second projector. The first projector is the projector 1 as a reference for adjustment of the installation angles of the other projectors 1. The second projector is the projector 1 at the installation angle adjusted by the user with reference to the installation angle of the first projector. In the embodiment, a case where the projector 1A operates as the first projector is exemplified and a case where the projectors 1B, 1C, 1D, 1E, 1F operate as the second projectors is exemplified.

The first projector is an example of "first display apparatus". The second projector is an example of "second display apparatus" and "display apparatus".

The projection system 1000 in FIG. 1 shows a display form after the respective installation angles of the projectors 1 are appropriately adjusted by the user. The installation angles of the projectors 1 of the embodiment are manually adjusted by the user. In FIG. 1, the projector 1A displays an image G1 superimposed on edge portions of images G2, G4, G5 on the screen SC. In FIG. 1, the projector 1B displays the image G2 superimposed on the edge portions of the images G1, G3, G4, G5, G6 on the screen SC. In FIG. 1, the projector 1C displays the image G3 superimposed on the edge portions of the images G2, G5, G6 on the screen SC. In FIG. 1, the projector 1D displays the image G4 superimposed on the edge portions of the images G1, G2, G5 on the screen SC. In FIG. 1, the projector 1E displays the image G5 superimposed on the edge portions of the images G1, G2, G3, G4, G6 on the screen SC. In FIG. 1, the projector 1F displays the image G6 superimposed on the edge portions of the images G2, G3, G5 on the screen SC.

The respective projectors 1A, 1B, 1C, 1D, 1E, 1F are connected to a network NW and communicate with one another. The network NW is a network including a communication equipment such as a public line network, a dedicated network, and other communication lines and the specific form is not limited. For example, the network NW may be a wide area network or a local network. The network NW may include at least one of a wireless communication circuit and a wired communication circuit.

As shown in FIG. 1, the projection system 1000 includes the image supply apparatus 2 connected to the network NW. The image supply apparatus 2 is an apparatus e.g. a notebook PC (Personal Computer), a desktop PC, a tablet terminal, a smartphone, a PDA (Personal Digital Assistant), or the like. The image supply apparatus 2 divides one frame of the image data into six pieces and outputs the respective divided pieces of image data to the respective projectors 1A, 1B, 10, 1D, 1E, 1F.

Figure 2:
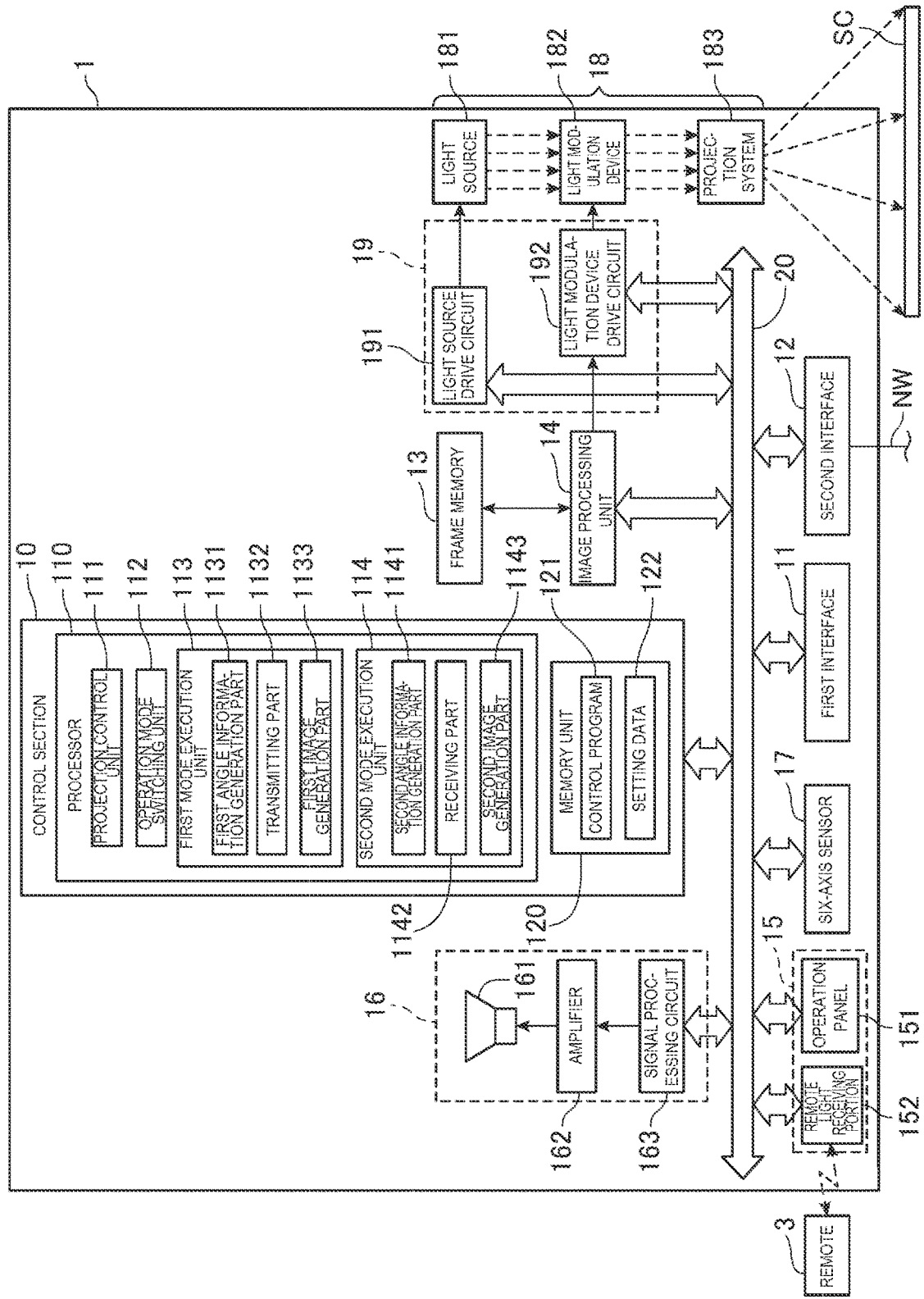
FIG. 2 shows a configuration of a projector.

FIG. 2 is a block diagram showing a configuration of the projector 1.

The projector 1 includes a control section 10.

The control section 10 includes a processor 110 executing programs such as a CPU (Central Processing Unit) or an MPU (Micro-processing unit) and a memory unit 120 and controls the respective units of the projector 1. In the control section 10, the processor 110 reads out a control program 121 stored in the memory unit 120 and executes processing. The processor 110 reads out and executes the control program 121, and thereby, functions as a projection control unit 111, an operation mode switching unit 112, a first mode execution unit 113, and a second mode execution unit 114.

The projection control unit 111 is an example of "reporting unit".

The memory unit 120 has a memory area in which the programs executed by the processor 110 and the data processed by the processor 110 are stored. The memory unit 120 has a non-volatile memory area in which the programs and the data are non-volatilely stored. Further, the memory unit 120 has a volatile memory area and may form a work area in which the programs executed by the processor 110 and the data to be processed are temporarily stored.

The memory unit 120 stores setting data 122 in addition to the control program 121 executed by the processor 110. The setting data 122 contains setting values relating to the operation of the projector 1. The setting values contained in the setting data 122 include e.g. setting values showing details of processing executed by an image processing unit 14 and values of parameters used for the processing by the image processing unit 14 etc.

The projector 1 includes a first interface 11, a second interface 12, a frame memory 13, the image processing unit 14, an operation unit 15, and a sound processing unit 16. These respective units are connected to the control section 10 via a bus 20 for data communications.

The first interface 11 includes communication hardware such as a connector and an interface circuit compliant to a predetermined communication standard. The first interface 11 transmits and receives image data, control data, etc. between an apparatus coupled to the projector 1 and itself according to the predetermined communication standard under control by the control section 10. The first interface 11 may include an interface that can digitally transmit pictures and sound such as an HDMI (High-Definition Multimedia Interface), a Displayport, an HDBaseT, a USB Type-C, or a 3G-SDI (Serial Digital Interface). The HDMI is a registered trademark. The HDBaseT is a registered trademark. Further, the first interface 11 may include a data communication interface such as a USB. Furthermore, the first interface 11 may include an interface that has analog picture terminals including an RCA terminal, a VGA terminal, an S terminal, and a D terminal and can transmit and receive analog picture signals.

The second interface 12 includes communication hardware such as a connector and an interface circuit connected to the network NW. The second interface 12 communicates with the image supply apparatus 2 and the other projectors 1 connected via the network NW according to a predetermined communication standard. The second interface 12 receives frame data from the image supply apparatus 2 and outputs the received frame data to the control section 10 via the network NW.

The frame memory 13 and the image processing unit 14 are formed by e.g. an integrated circuit. The integrated circuit includes an LSI, an ASIC (Application Specific Integrated Circuit), a PLD (Programmable Logic Device), an FPGA (Field-Programmable Gate Array), and an SoC (System-on-a-chip). Alternatively, part of the configuration of the integrated circuit may include an analog circuit or the control section 10 and the integrated circuit may be combined.

The frame memory 13 includes a plurality of banks. Each bank has a memory capacity in which one frame can be written. The frame memory 13 includes e.g. an SDRAM (Synchronous Dynamic Random Access Memory).

The image processing unit 14 performs image processing e.g. resolution conversion processing or resizing processing, distortion correction, shape correction processing, digital zooming processing, and adjustment of tint and brightness of images. The image processing unit 14 executes processing designated by the control section 10 and performs processing using the parameters input from the control section 10 as necessary. Further, the image processing unit 14 can combine and execute a plurality of types of image processing of the above described processing.

The image processing unit 14 reads out and outputs the processed image data from the frame memory 13 to a light modulation device drive circuit 192.

The operation unit 15 includes an operation panel 151 and a remote light receiving portion 152.

The operation panel 151 is provided in e.g. a housing of the projector 1 and includes various switches including a power switch for turning on and off the power of the projector 1. When the switch is operated, the operation panel 151 outputs a signal corresponding to the operated switch to the control section 10.

The remote light receiving portion 152 includes a light receiving sensor receiving an infrared signal transmitted by a remote 3 and a circuit decoding the infrared signal received by the light receiving sensor. The remote light receiving portion 152 outputs a signal corresponding to the infrared signal received by the light receiving sensor to the control section 10. The signal output to the control section 10 by the remote light receiving portion 152 is a signal corresponding to the operated switch of the remote 3.

The sound processing unit 16 includes a speaker 161, an amplifier 162, and a signal processing circuit 163. Note that the sound processing unit 16 may include a microphone.

When digital sound data is input from the control section 10, the signal processing circuit 163 converts the input sound data from digital to analog. The signal processing circuit 163 outputs the converted analog sound data to the amplifier 162.

The amplifier 162 amplifies the volume of the sound represented by the sound data input from the signal processing circuit 163 with an amplification factor according to the sound designated by the user. The speaker 161 outputs the sound based on the sound data output by the signal processing circuit 163 at the volume amplified by the amplifier 162.

The projector 1 includes a six-axis sensor 17. The six-axis sensor 17 is a motion sensor including a three-axis acceleration sensor and a three-axis gyro sensor. For the six-axis sensor 17, an IMU (Inertial Measurement Unit) in which the three-axis acceleration sensor and the three-axis gyro sensor are modularized may be employed. The six-axis sensor 17 outputs detection values to the control section 10.

The six-axis sensor 17 is an example of "sensor".

Figure 3:
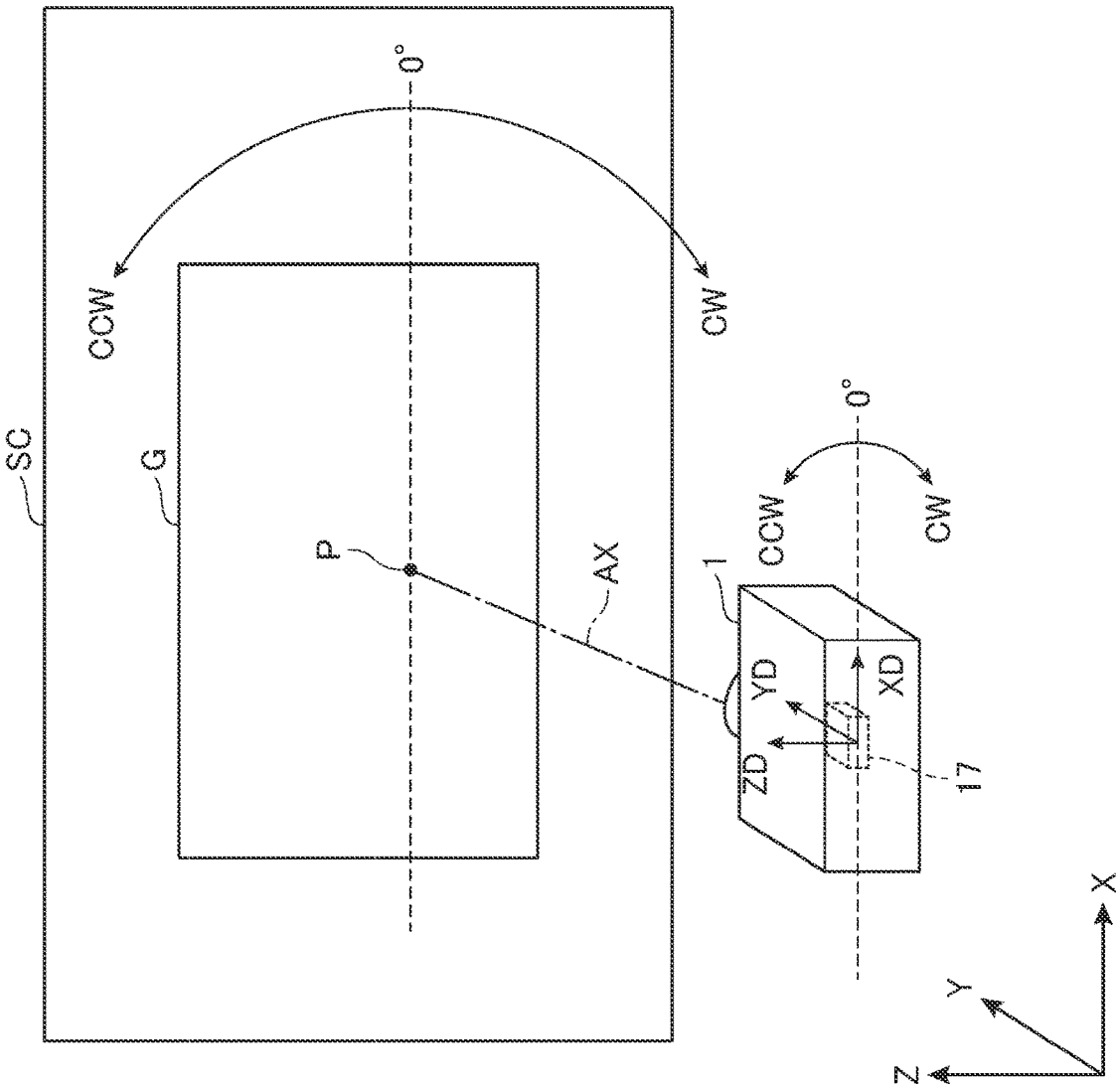
FIG. 3 is an explanatory diagram of a six-axis sensor and an installation angle of the projector.

FIG. 3 is an explanatory diagram of detection axes of the six-axis sensor 17 and the installation angle of the projector 1.

In FIG. 3, the detection axes of the six-axis sensor 17 are shown as an XD-axis, a YD-axis, and a ZD-axis. The XD-axis, the YD-axis, and the ZD-axis are orthogonal to one another. The XD-axis and the YD-axis form a horizontal plane as a reference for the installation angle of the projector 1. The ZD-axis is an axis perpendicular to the horizontal plane formed by the XD-axis and the YD-axis. For example, the six-axis sensor 17 is calibrated when the horizontal direction of the attitude of the projector 1 is parallel to the horizontal plane formed by the XD-axis and the YD-axis.

The six-axis sensor 17 detects an angular velocity around the XD-axis, an angular velocity around the YD-axis, and an angular velocity around the ZD-axis and outputs detection values to the control section 10. Further, the six-axis sensor 17 detects an acceleration in the XD-axis direction, an acceleration in the YD-axis direction, and an acceleration in the ZD-axis direction and outputs detection values to the control section 10.

In the embodiment, the installation angle of the projector 1 is an angle of the XD-axis relative to the X-axis. Therefore, in the projector 1 of the embodiment, the angle of the XD-axis relative to the X-axis is adjusted as the installation angle by the user. The installation angle of the projector 1 of the embodiment is 0° when the XD-axis of the six-axis sensor 17 and the X-axis are parallel, indicates a negative value counterclockwise around the YD-axis, and indicates a positive value clockwise around the YD-axis. The image G displayed by the projector 1 rotates around a point P according to the installation angle of the projector 1. The point P is an intersection between an optical axis AX of the image light projected by the projector 1 and the screen SC. The rotation angle of the image G displayed by the projector 1 of the embodiment is 0° on the X-axis, indicates a negative value counterclockwise around the point P, and indicates a positive value clockwise around the point P. FIG. 3 shows a clockwise direction around the YD-axis by a sign CW and a counterclockwise direction by a sign CCW.

The projector 1 includes a projection unit 18 and a drive unit 19 driving the projection unit 18.

The projection unit 18 includes a light source 181, a light modulation device 182, and a projection system 183. The drive unit 19 includes a light source drive circuit 191 and the light modulation device drive circuit 192.

The light source drive circuit 191 is coupled to the control section 10 via the bus 20 and coupled to the light source 181. The light source drive circuit 191 turns on or off the light source 181 according to the control by the control section 10.

The light modulation device drive circuit 192 is coupled to the control section 10 via the bus 20 and coupled to the light modulation device 182. The light modulation device drive circuit 192 drives the light modulation device 182 and draws images in units of frames on a light modulation element of the light modulation device 182 according to the control by the control section 10. Image data corresponding to the respective primary colors of RGB is input from the image processing unit 14 to the light modulation device drive circuit 192. R shows red, G shows green, and B shows blue. The light modulation device drive circuit 192 converts the input image data into a data signal suitable for the operation of the liquid crystal panel as the light modulation element of the light modulation device 182. The light modulation device drive circuit 192 applies voltages to the respective pixels of the respective liquid crystal panels and draws images on the respective liquid crystal panels based on the converted data signal.

The light source 181 includes a lamp such as a halogen lamp, a xenon lamp, or a super high-pressure mercury lamp or a solid-state light source such as an LED or a laser beam source. The light source 181 is turned on by power supplied from the light source drive circuit 191 and emits light toward the light modulation device 182.

The light modulation device 182 includes e.g. three liquid crystal panels corresponding to the three primary colors of RGB. The light output from the light source 181 is separated into three color lights of RGB and entered into the respectively corresponding liquid crystal panels. Each of the three liquid crystal panels is a transmissive liquid crystal panel and modulates the transmitted light and generates an image light. The image lights passing through the respective liquid crystal panels and modulated are combined by a combining system such as a cross dichroic prism and output to the projection system 183.

In the embodiment, a case where the light modulation device 182 includes the transmissive liquid crystal panels as the light modulation elements is exemplified, however, the light modulation elements may be reflective liquid crystal panels or digital mirror devices.

The projection system 183 includes a lens, a mirror, etc. focusing the image light modulated by the light modulation device 182 on the screen SC. The projection system 183 may include a zooming mechanism enlarging or reducing the image G displayed on the screen SC and a focus adjustment mechanism performing focus adjustment.

As described above, the processor 110 functions as the projection control unit 111, the operation mode switching unit 112, the first mode execution unit 113, and the second mode execution unit 114.

The projection control unit 111 controls the image processing unit 14, the drive unit 19, etc. to display the image G on the screen SC.

Specifically, the projection control unit 111 controls the image processing unit 14 to process the image data loaded in the frame memory 13 by the image processing unit 14. Concurrently, the projection control unit 111 reads out and outputs the parameters necessary for the image processing unit 14 for processing from the memory unit 120 to the image processing unit 14.

The projection control unit 111 controls the light source drive circuit 191 and the light modulation device drive circuit 192 to turn on the light source 181 by the light source drive circuit 191 and drive the light modulation device 182 by the light modulation device drive circuit 192, and displays the image G on the screen SC by the projection unit 18. Further, the projection control unit 111 controls the projection system 183 to activate the motor and adjusts zoom and focus of the projection system 183.

The operation mode switching unit 112 switches the operation mode of the projector 1 to one of a normal mode, a first mode, and a second mode. The normal mode is another operation mode than the first mode and the second mode, in which the image based on the image data supplied from the image supply apparatus 2 can be displayed on the screen SC. The first mode is an operation mode in which the projector 1 is operated as the first projector. The second mode is an operation mode in which the projector 1 is operated as the second projector. When receiving an instruction to operate the projector 1 as the first projector from the user via the operation unit 15, the operation mode switching unit 112 switches the operation mode of the projector 1 from the normal mode to the first mode. When receiving an instruction to operate the projector 1 as the second projector from the user via the operation unit 15, the operation mode switching unit 112 switches the operation mode of the projector 1 from the normal mode to the second mode. When receiving an instruction to end the adjustment of the installation angle of the projector 1 from the user via the operation unit 15, the operation mode switching unit 112 switches the operation mode of the projector 1 from the first mode or the second mode to the normal mode.

The first mode execution unit 113 is a functional unit in which the processor 110 functions when the operation mode of the projector 1 is the first mode. The first mode execution unit 113 functions as a first angle information generation part 1131, a transmitting part 1132, and a first image generation part 1133.

The first angle information generation part 1131 generates first angle information representing the installation angle of the projector 1 operating as the first projector based on the detection values of the six-axis sensor 17. The first angle information generation part 1131 calculates the installation angle of the projector 1 operating as the first projector relative to the X-axis by time integration of the angular velocity around the YD-axis and generates first angle information representing the calculated installation angle.

The transmitting part 1132 transmits the first angle information generated by the first angle information generation part 1131 to the other projectors 1 connected to the network NW via the second interface 12. Note that the addresses of the other projectors 1 are stored in the memory unit 120 in advance.

The first image generation part 1133 generates a second guide image GD2. The second guide image GD2 is the image G for guiding the adjustment of the installation angle of the second projector. The first image generation part 1133 generates the second guide image GD2, and then, loads the image data of the second guide image GD2 in the frame memory.

FIG. 4 shows an example of the second guide image GD2 displayed on the screen SC.

The second guide image GD2 contains a reference line segment KL. The reference line segment KL is a line segment showing a reference of the installation angle of the second projector. The reference line segment KL of the embodiment is the line segment parallel to the X-axis. In FIG. 4, the second guide image GD2 displayed by the first projector tilting by α° relative to the X-axis is exemplified. Accordingly, the second guide image GD2 shown in FIG. 4 tilts by α° relative to the X-axis. Here, α is a positive value.

The reference line segment KL is an example of "third line segment".

The first image generation part 1133 generates the second guide image GD2 containing the reference line segment KL parallel to the X-axis.

Returning to the explanation of the functional units of the processor 110, the second mode execution unit 114 is a functional unit in which the processor 110 functions when the operation mode of the projector 1 is the second mode. The second mode execution unit 114 functions as a second angle information generation part 1141, a receiving part 1142, and a second image generation part 1143.

The second angle information generation part 1141 is an example of "generation part".

The second angle information generation part 1141 generates second angle information representing the installation angle of the projector 1 operating as the second projector based on the detection values of the six-axis sensor 17. The second angle information generation part 1141 calculates the installation angle of the projector 1 operating as the second projector relative to the X-axis by time integration of the angular velocity around the YD-axis and generates second angle information representing the calculated installation angle.

The receiving part 1142 receives the first angle information generated by the first angle information generation part 1131 from the first projector via the second interface 12.

The second image generation part 1143 generates a first guide image GD1. The first guide image GD1 is the image for guiding the adjustment of the installation angle of the second projector. The second image generation part 1143 generates the first guide image GD1, and then, loads the image data of the first guide image GD1 in the frame memory.

Figure 5:
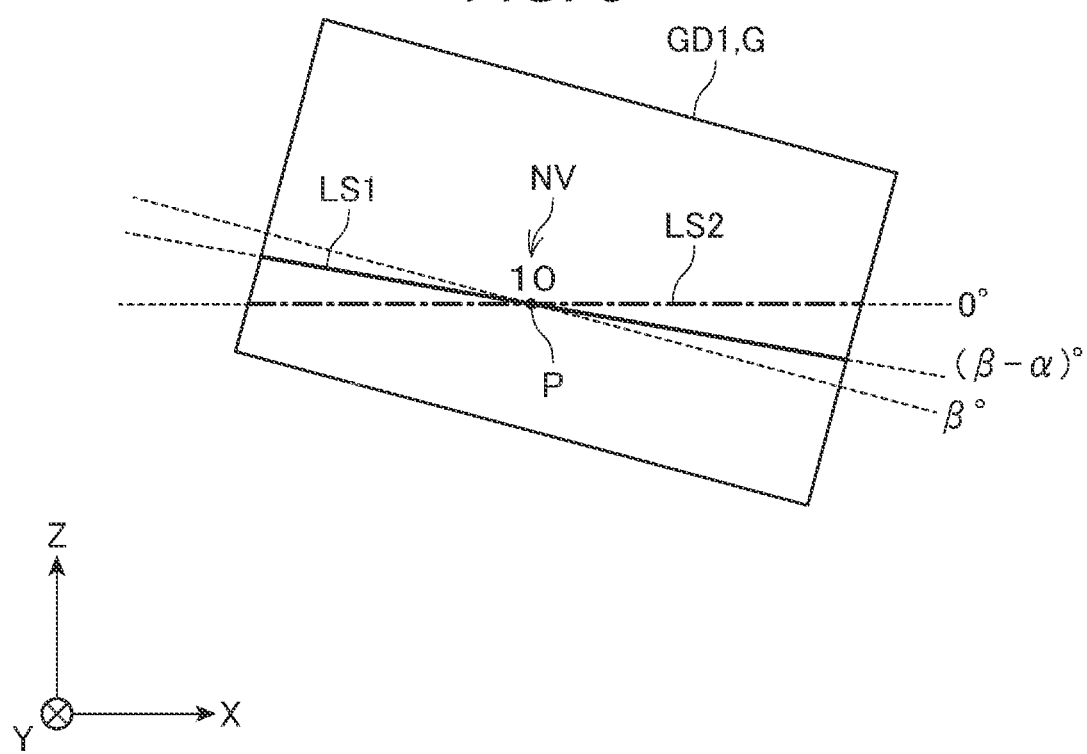
FIG. 5 shows an example of a first guide image.

FIG. 5 shows an example of the first guide image GD1 displayed on the screen SC.

The first guide image GD1 contains a first line segment LS1. The first line segment LS1 is a line segment tilting at an angle according to the installation angle of the first projector and shows the installation angle of the first display apparatus. The first line segment LS1 tilts by an angle corresponding to the difference between the installation angle of the first projector and the installation angle of the second projector relative to the X-axis. The color of the first line segment LS1 changes according to the difference between the installation angle of the first projector and the installation angle of the second projector. The first guide image GD1 is an example of information representing the difference.

The first guide image GD1 contains a second line segment LS2. The second line segment LS2 is a line segment showing a tilt at which the difference between the installation angle of the second projector and the installation angle of the first projector is 0°. The second line segment LS2 tilts from the first line segment LS1 by an angle showing the difference between the installation angle of the second projector and the installation angle of the first projector. In the embodiment, the color of the first line segment LS1 is the same as the color of the reference line segment KL, however, may be different from the color of the reference line segment KL.

The first guide image GD1 contains a numerical value NV showing the difference between the installation angle of the second projector and the installation angle of the first projector. The color of the numerical value NV changes according to the magnitude of the value. The first guide image GD1 of the embodiment does not contain the numerical value NV when the difference between the installation angle of the second projector and the installation angle of the first projector is 0°, however, may contain the numerical value NV showing 0° when the difference is 0°.

The second image generation part 1143 generates the first guide image GD1 based on the second angle information generated by the second angle information generation part 1141 and the first angle information received by the receiving part 1142.

For example, it is assumed that the installation angle of the first projector is α° relative to the X-axis and the installation angle of the second projector is β° relative to the X-axis. Here, β and α are positive values and β is larger than α. The second image generation part 1143 performs calculation "β−α" and obtains the difference between the installation angle of the first projector and the installation angle of the second projector. Then, the second image generation part 1143 includes the first line segment LS1 tilting by (β−α°) from the X-axis in the first guide image GD1. The second image generation part 1143 includes the second line segment LS2 having the color corresponding to (β−α°) and tilting by (−(β−α)°) from the first line segment LS1 in the first guide image GD1. The second line segment LS2 of the embodiment is the line segment parallel to the X-axis. Then, the second image generation part 1143 includes the numerical value NV having the color corresponding to (β−α°) and showing (β−α°) in the first guide image GD1.

Next, an operation of the projection system 1000 relating to the adjustment of the installation angle of the projector 1 will be explained.

Figure 6:
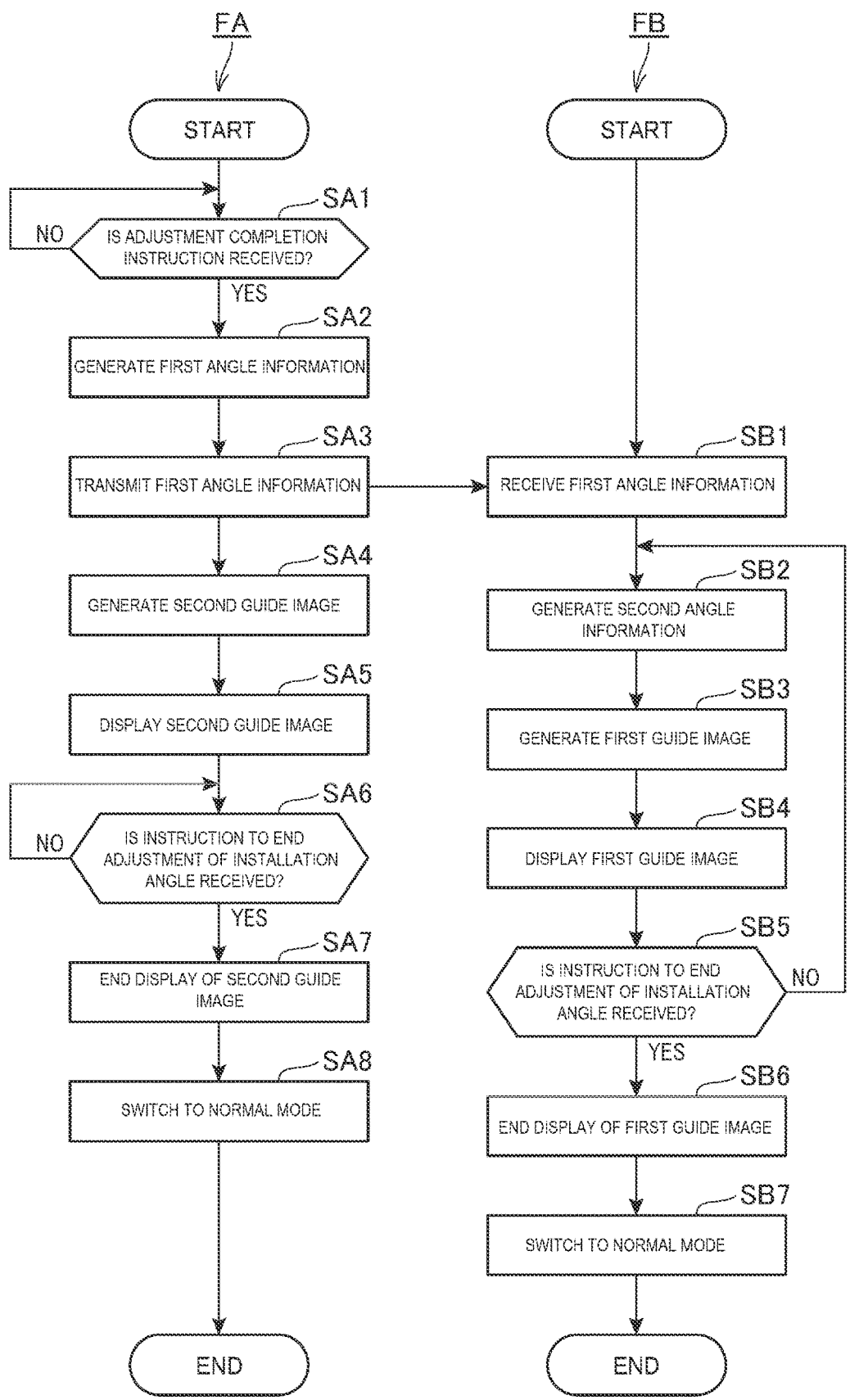
FIG. 6 shows flowcharts showing an operation of the projection system.

FIG. 6 shows flowcharts showing the operation of the projection system 1000. In FIG. 6, a flowchart FA shows an operation of the first projector and a flowchart FB shows an operation of the second projector. In the case of FIG. 1, the flowchart FA shows the operation of the projector 1A and the flowchart FB shows the operation of the projectors 1B, 1C, 1D, 1E, 1F.

As shown by the flowchart FA, the first angle information generation part 1131 of the first mode execution unit 113 determines whether or not an adjustment completion instruction of the installation angle is received via the operation unit 15 (step SA1).

When determining that the adjustment completion instruction of the installation angle of the first projector is not received (step SA1: NO), the first angle information generation part 1131 performs the determination at step SA1 again.

On the other hand, when determining that the adjustment completion instruction of the installation angle of the first projector is received (step SA1: YES), the first angle information generation part 1131 generates the first angle information (step SA2). At step SA2, the first angle information generation part 1131 generates the first angle information based on the detection values output by the six-axis sensor 17 after determination at step SA1.

Then, the transmitting part 1132 transmits the first angle information generated by the angle information generation part 1131 to the respective second projectors 2 (step SA3).

Then, the first image generation part 1133 generates the second guide image GD2 (step SA4).

Then, the projection control unit 111 displays the second guide image GD2 generated at step SA4 on the screen SC (step SA5).

Then, the operation mode switching unit 112 determines whether or not an instruction to end the adjustment of the installation angle of the projector 1 is received from the user via the operation unit 15 (step SA6).

When the operation mode switching unit 112 determines that the instruction to end the adjustment of the installation angle of the projector 1 is not received (step SA6: NO), the projection control unit 111 continues to display the second guide image GD2.

On the other hand, when the operation mode switching unit 112 determines that the instruction to end the adjustment of the installation angle of the projector 1 is received (step SA6: YES), the projection control unit 111 ends the display of the second guide image GD2 (step SA7).

Then, the operation mode switching unit 112 switches the operation mode of the projector 1 from the first mode to the normal mode (step SA8).

As shown by the flowchart FB, the receiving part 1142 of the second mode execution unit 114 receives the first angle information from the first projector (step SB1).

Then, the second angle information generation part 1141 generates the second angle information based on the detection values output by the six-axis sensor 17 (step SB2).

Then, the second image generation part 1143 generates the first guide image GD1 based on the first angle information received at step SB1 and the second angle information generated at step SB2 (step SB3).

Then, the projection control unit 111 projects the first guide image GD1 generated at step SB3 (step SB4).

Then, the operation mode switching unit 112 determines whether or not an instruction to end the adjustment of the installation angle of the projector 1 is received from the user via the operation unit 15 (step SB5).

When the operation mode switching unit 112 determines that the instruction to end the adjustment of the installation angle of the projector 1 is not received (step SB5: NO), the processor 110 of the second projector performs the processing at step SB2 and the subsequent steps again.

On the other hand, when the operation mode switching unit 112 determines that the instruction to end the adjustment of the installation angle of the projector 1 is received (step SB5: YES), the projection control unit 111 ends the display of the first guide image GD1 (step SB6).

Then, the operation mode switching unit 112 switches the operation mode of the projector 1 from the second mode to the normal mode (step SB7).

FIG. 7 shows examples of the images G displayed in adjustment of the installation angles of the projectors 1.

In FIG. 7, the projector 1A operating as the first projector displays the second guide image GD2 as the image G1. The second guide image GD2 displayed as the image G1 contains the reference line segment KL parallel to the X-axis.

In FIG. 7, the projector 1B operating as the second projector displays the first guide image GD1 as the image G2. The first guide image GD1 shows that the difference between the installation angle of the projector 1A and the installation angle of the projector 1B is 10°. In FIG. 7, the first guide image GD1 as the image G2 contains the first line segment LS1 tilting by 10° relative to the X-axis and the second line segment LS2 tilting by −10° from the first line segment LS1. The color of the second line segment LS2 is a color corresponding to that the difference between the installation angle of the projector 1A and the installation angle of the projector 1B is 10°. Further, in FIG. 7, the first guide image GD1 as the image G2 contains the numerical value NV showing that the difference between the installation angle of the projector 1A and the installation angle of the projector 1B is 10°. The numerical value NV has a color corresponding to that the difference between the installation angle of the projector 1A and the installation angle of the projector 1B is 10°.

In FIG. 7, the projector 1C operating as the second projector displays the first guide image GD1 as the image G3. In FIG. 7, in the first guide image GD1 displayed as the image G3, the tilt of the first line segment LS1 and the tilt of the second line segment LS2 are the same. That is, the installation angle of the projector 1A and the installation angle of the projector 1C are the same and the numerical value NV is not contained. FIG. 7 shows that the difference between the installation angle of the projector 1A and the installation angle of the projector 10 is 0° in the first guide image GD1 displayed as the image G3. In FIG. 7, the color of the second line segment LS2 contained in the first guide image GD1 as the image G3 is a color corresponding to that the difference between the installation angle of the projector 1A and the installation angle of the projector 1C is 0°, e.g. the same color as that of the first line segment LS1.

In FIG. 7, the projector 1D operating as the second projector displays the first guide image GD1 as the image G4. The first guide image GD1 shows that the difference between the installation angle of the projector 1A and the installation angle of the projector 1D is 5°. In FIG. 7, the first guide image GD1 as the image G4 contains the first line segment LS1 tilting by 5° relative to the X-axis and the second line segment LS2 tilting by −5° from the first line segment LS1. The color of the second line segment LS2 is a color corresponding to that the difference between the installation angle of the projector 1A and the installation angle of the projector 1D is 5°. Further, in FIG. 7, the first guide image GD1 as the image G4 contains the numerical value NV showing that the difference between the installation angle of the projector 1A and the installation angle of the projector 1D is 5°. The numerical value NV has a color corresponding to that the difference between the installation angle of the projector 1A and the installation angle of the projector 1D is 5°.

In FIG. 7, the projector 1E operating as the second projector displays the first guide image GD1 as the image G5. The first guide image GD1 shows that the difference between the installation angle of the projector 1A and the installation angle of the projector 1E is 20°. In FIG. 7, the first guide image GD1 as the image G5 contains the first line segment LS1 tilting by 20° relative to the X-axis and the second line segment LS2 tilting by −20° from the first line segment LS1. The color of the second line segment LS2 is a color corresponding to that the difference between the installation angle of the projector 1A and the installation angle of the projector 1E is 20°. Further, in FIG. 7, the first guide image GD1 as the image G5 contains the numerical value NV showing that the difference between the installation angle of the projector 1A and the installation angle of the projector 1E is 20°. The numerical value NV has a color corresponding to that the difference between the installation angle of the projector 1A and the installation angle of the projector 1E is 20°.

In FIG. 7, the projector 1F operating as the second projector displays the first guide image GD1 as the image G6. The first guide image GD1 shows that the difference between the installation angle of the projector 1A and the installation angle of the projector 1F is 30°. In FIG. 7, the first guide image GD1 as the image G6 contains the first line segment LS1 tilting by 30° relative to the X-axis and the second line segment LS2 tilting by −30° from the first line segment LS1. The color of the first line segment LS1 is a color corresponding to that the difference between the installation angle of the projector 1A and the installation angle of the projector 1F is 30°. Further, in FIG. 7, the first guide image GD1 as the image G6 contains the numerical value NV showing that the difference between the installation angle of the projector 1A and the installation angle of the projector 1F is 30°. The numerical value NV has a color corresponding to that the difference between the installation angle of the projector 1A and the installation angle of the projector 1F is 30°.

As shown in FIG. 7, in the first guide image GD1 displayed by the second projector, the difference between the installation angle of the projector 1A and the installation angle of the projector 1B is visualized. Accordingly, the user may easily grasp the difference between the installation angle of the first projector and the installation angle of the second projector and easily adjust the installation angle of the second projector. Further, as shown in FIG. 7, in the second guide image GD2 displayed by the first projector, the installation angles to be adjusted by the second projectors are visualized. Accordingly, the user may adjust the installation angles of the second projectors more easily.

As described above, the display method by the projection system 1000 includes generating the first angle information representing the installation angle of the first projector based on the detection values of the six-axis sensor 17 of the first projector by the first projector, generating the second angle information representing the installation angle of the second projector based on the detection values of the six-axis sensor 17 of the second projector by the second projector, and displaying the information representing the difference between the installation angle of the first projector represented by the first angle information acquired from the first projector and the installation angle of the second projector represented by the second angle information by the second projector.

According to the configuration, the user adjusting the installation angle of the projector 1 may grasp the difference between the installation angle of the first projector and the installation angle of the second projector. Accordingly, the user adjusts the installation angle of the second projector so that the difference may be 0°, and thereby, may install the plurality of projectors 1 at arbitrary equal angles. Therefore, when installing the plurality of projectors 1 at arbitrary equal angles, the user may easily adjust the installation angles of the projectors 1 without the need to perform complex work e.g. input of the installation angles to the respective projectors 1.

The display method by the projection system 1000 includes displaying the first guide image GD1 for guiding the adjustment of the installation angle of the second projector by the second projector. The first guide image GD1 shows the difference between the installation angle of the first projector and the installation angle of the second projector.

According to the configuration, the user adjusting the installation angle of the projector 1 may grasp the difference between the installation angle of the first projector and the installation angle of the second projector and may be supported in the adjustment of the installation angle of the projector 1. Therefore, when installing the plurality of projectors 1 at arbitrary equal angles, the user may easily and appropriately adjust the installation angles of the projectors 1.

The first guide image GD1 contains the numerical value NV showing the difference between the installation angle of the first projector and the installation angle of the second projector.

According to the configuration, the user adjusting the installation angle of the projector 1 may easily grasp the difference between the installation angle of the first projector and the installation angle of the second projector. Therefore, when installing the plurality of projectors 1 at arbitrary equal angles, the user may adjust the installation angles of the projectors 1 more easily.

The color of the numerical value NV changes according to the difference between the installation angle of the first projector and the installation angle of the second projector.

According to the configuration, even when it is difficult for the user adjusting the installation angle of the projector 1 to grasp the numerical value NV for a predetermined reason, the user may grasp the difference between the installation angle of the first projector and the installation angle of the second projector by the color of the numerical value NV. Therefore, when installing the plurality of projectors 1 at arbitrary equal angles, the user may easily adjust the installation angles of the projectors 1. For example, even when the screen SC and the projectors 1 are far apart and the user is hard to grasp the numerical value NV, the user may easily adjust the installation angles of the projectors 1.

The first guide image GD1 contains the first line segment LS1 and the second line segment LS2. The second line segment LS2 tilts by the angle indicated by the difference between the installation angle of the first projector and the installation angle of the second projector from the first line segment LS1.

According to the configuration, the user adjusting the installation angle of the projector 1 may easily grasp the difference between the installation angle of the first projector and the installation angle of the second projector. Therefore, when installing the plurality of projectors 1 at arbitrary equal angles, the user may adjust the installation angles of the projectors 1 more easily.

The color of the second line segment LS2 changes according to the difference between the installation angle of the first projector and the installation angle of the second projector.

According to the configuration, even when it is difficult for the user adjusting the installation angle of the projector 1 to grasp the tilt of the second line segment LS2 relative to the first line segment LS1 for a predetermined reason, the user may grasp the difference between the installation angle of the first projector and the installation angle of the second projector by the color of the second line segment LS2. Therefore, when installing the plurality of projectors 1 at arbitrary equal angles, the user may easily adjust the installation angles of the projectors 1. For example, even when the screen SC and the projectors 1 are far apart and the user is hard to grasp the tilt of the second line segment LS2 relative to the first line segment LS1, the user may easily adjust the installation angles of the projectors 1.

The display method for the projection system 1000 includes displaying the second guide image GD2 for guiding the adjustment of the installation angle of the second projector by the first projector. The second guide image GD2 contains the reference line segment KL. The reference line segment KL shows the reference for the installation angle of the second projector.

According to the configuration, in the second guide image GD2 displayed by the first projector, the installation angles to be adjusted by the second projectors are visualized. Therefore, when installing the plurality of projectors 1 at arbitrary equal angles, the user may adjust the installation angles of the projectors 1 more easily.

The projection system 1000 includes the first projector and the second projector. In the projection system 1000, the first projector generates the first angle information representing the installation angle of the first projector based on the detection values of the six-axis sensor 17 of the first projector, the second projector generates the second angle information representing the installation angle of the second projector based on the detection values of the six-axis sensor 17 of the second projector, and the second projector displays the information representing the difference between the installation angle of the first projector represented by the first angle information acquired from the first projector and the installation angle of the second projector represented by the second angle information.

According to the configuration, the same effects as those of the display method by the projection system 1000 may be exerted.

The second projector includes the six-axis sensor 17 detecting the installation angle of the second projector, the second angle information generation part 1141 generating the second angle information representing the installation angle of the second projector based on the detection values of the six-axis sensor 17, the receiving part 1142 receiving the first angle information representing the installation angle of the first projector different from the second projector, and the projection control unit 111 displaying the information representing the difference between the installation angle represented by the first angle information received by the receiving part 1142 and the installation angle represented by the second angle information generated by the second angle information generation part 1141.

According to the configuration, the same effects as those of the display method by the projection system 1000 may be exerted.

Second Embodiment

A second embodiment will be explained. In the following exemplified respective embodiments, the elements having the same actions and functions as those of the first embodiment have the signs used in the explanation of the first embodiment in common and the respective detailed descriptions will be appropriately omitted.

The first guide image GD1 of the first embodiment contains the first line segment LS1 and the second line segment LS2. The first guide image GD1 of the second embodiment contains the second line segment LS2, but does not contain the first line segment LS1. The color of the second line segment LS2 of the second embodiment changes according to the difference between the installation angle of the first projector and the installation angle of the second projector like that in the first embodiment.

FIG. 8 shows examples of images displayed in adjustment of the installation angles of the projectors 1.

In FIG. 8, the projector 1A operating as the first projector displays the second guide image GD2 as the image G1. The second guide image GD2 displayed as the image G1 contains the reference line segment KL parallel to the X-axis direction.

In FIG. 8, the projector 1B operating as the second projector displays the first guide image GD1 as the image G2. In FIG. 8, the first guide image GD1 displayed as the image G2 shows that the difference between the installation angle of the projector 1A and the installation angle of the projector 1B is 10°.

In FIG. 8, the projector 1C operating as the second projector displays the first guide image GD1 as the image G3. In FIG. 8, in the first guide image GD1 displayed as the image G3, the installation angle of the projector 1A and the installation angle of the projector 10 are the same and the numerical value NV is not contained. FIG. 8 shows that the difference between the installation angle of the projector 1A and the installation angle of the projector 10 is 0° in the first guide image GD1 displayed as the image G3.

In FIG. 8, the projector 1D operating as the second projector displays the first guide image GD1 as the image G4. In FIG. 8, the first guide image GD1 displayed as the image G4 shows that the difference between the installation angle of the projector 1A and the installation angle of the projector 1D is 5°.

In FIG. 8, the projector 1E operating as the second projector displays the first guide image GD1 as the image G5. In FIG. 8, the first guide image GD1 displayed as the image G5 shows that the difference between the installation angle of the projector 1A and the installation angle of the projector 1E is 20°.

In FIG. 8, the projector 1F operating as the second projector displays the first guide image GD1 as the image G6. In FIG. 8, the first guide image GD1 displayed as the image G6 shows that the difference between the installation angle of the projector 1A and the installation angle of the projector 1F is 30°.

Note that, in the second embodiment, the first guide image GD1 containing the numerical value NV is exemplified, however, the first guide image GD1 not containing the numerical value NV may be displayed.

As described above, in the second embodiment, the first guide image GD1 contains the second line segment LS2. The color of the second line segment LS2 changes according to the difference between the installation angle of the first projector and the installation angle of the second projector.

According to the configuration, the user adjusting the installation angle of the projector 1 may easily grasp the difference between the installation angle of the first projector and the installation angle of the second projector. Therefore, when installing the plurality of projectors 1 at arbitrary equal angles, the user may adjust the installation angles of the projectors 1 more easily.

Third Embodiment

A third embodiment will be explained.

The first guide image GD1 of the first embodiment contains the first line segment LS1 and the second line segment LS2. The first guide image GD1 of the third embodiment contains the first line segment LS1, but does not contain the second line segment LS2. The color of the first line segment LS1 of the third embodiment changes according to the difference between the installation angle of the first projector and the installation angle of the second projector. The second image generation part 1143 of the third embodiment includes the first line segment LS1 having the color according to the difference between the installation angle of the first projector and the installation angle of the second projector in the first guide image GD1.

FIG. 9 shows examples of images displayed in adjustment of the installation angles of the projectors 1.

In FIG. 9, the projector 1A operating as the first projector displays the second guide image GD2 as the image G1. The second guide image GD2 displayed as the image G1 contains the reference line segment KL parallel to the X-axis direction.

In FIG. 9, the projector 1B operating as the second projector displays the first guide image GD1 as the image G2. In FIG. 9, the first guide image GD1 displayed as the image G2 shows that the difference between the installation angle of the projector 1A and the installation angle of the projector 1B is 10°. In FIG. 9, the color of the first line segment LS1 contained in the first guide image GD1 as the image G2 is the color corresponding to that the difference between the installation angle of the projector 1A and the installation angle of the projector 1B is 10°.

In FIG. 9, the projector 1C operating as the second projector displays the first guide image GD1 as the image G3. In FIG. 9, the first guide image GD1 displayed as the image G3 shows that the difference between the installation angle of the projector 1A and the installation angle of the projector 1C is 0°. In FIG. 9, the color of the first line segment LS1 contained in the first guide image GD1 as the image G3 is the color corresponding to that the difference between the installation angle of the projector 1A and the installation angle of the projector 1C is 0°, e.g. the same color as that of the reference line segment KL.

In FIG. 9, the projector 1D operating as the second projector displays the first guide image GD1 as the image G4. In FIG. 9, the first guide image GD1 displayed as the image G4 shows that the difference between the installation angle of the projector 1A and the installation angle of the projector 1D is 5°. In FIG. 9, the color of the first line segment LS1 contained in the first guide image GD1 as the image G4 is the color corresponding to that the difference between the installation angle of the projector 1A and the installation angle of the projector 1D is 5°.

In FIG. 9, the projector 1E operating as the second projector displays the first guide image GD1 as the image G5. In FIG. 9, the first guide image GD1 displayed as the image G5 shows that the difference between the installation angle of the projector 1A and the installation angle of the projector 1E is 20°. In FIG. 9, the color of the first line segment LS1 contained in the first guide image GD1 as the image G5 is the color corresponding to that the difference between the installation angle of the projector 1A and the installation angle of the projector 1E is 20°.

In FIG. 9, the projector 1F operating as the second projector projects the first guide image GD1 as the image G6. In FIG. 9, the first guide image GD1 projected as the image G6 shows that the difference between the installation angle of the projector 1A and the installation angle of the projector 1F is 30°. In FIG. 9, the color of the first line segment LS1 contained in the first guide image GD1 as the image G6 is the color corresponding to that the difference between the installation angle of the projector 1A and the installation angle of the projector 1F is 30°.

Note that, in the third embodiment, the first guide image GD1 containing the numerical value NV is exemplified, however, the first guide image GD1 not containing the numerical value NV may be displayed.

As described above, in the third embodiment, the first guide image GD1 contains the first line segment LS1. The first line segment LS1 tilts at an angle according to the installation angle of the first projector. The color of the first line segment LS1 changes according to the difference between the installation angle of the first projector and the installation angle of the second projector.

According to the configuration, the user adjusting the installation angle of the projector 1 may easily grasp the difference between the installation angle of the first projector and the installation angle of the second projector. Therefore, when installing the plurality of projectors 1 at arbitrary equal angles, the user may adjust the installation angles of the projectors 1 more easily.

The above described respective embodiments are preferred embodiments of the present disclosure. The present disclosure is not limited to the embodiments, but various modifications can be made without departing from the scope of the present disclosure.

In the above described respective embodiments, the projector 1A is exemplified as the first projector and the projectors 1B, 1C, 1D, 1E, 1F are exemplified as the second projectors. However, the first projector and the second projector are not limited to these projectors 1. For example, the first projector may be the projector 1B and the second projectors may be the projectors 1A, 10, 1D, 1E, 1F.

In the above described respective embodiments, the six-axis sensor 17 is exemplified as "sensor", however, "sensor" according to the present disclosure is not limited to the six-axis sensor 17, but may be a nine-axis sensor including a geomagnetic sensor or a three-axis gyro sensor.

In the above described respective embodiments, the case where the reference line segment KL is the line segment parallel to the X-axis is exemplified, however, the angle of the reference line segment KL is not limited to that parallel to the X-axis, but may be an angle designated by the user in advance. In this case, the second line segment LS2 contained in the first guide image GD1 tilts at the same angle as the reference line segment KL.

In the above described respective embodiments, the angle of the XD-axis relative to the X-axis is exemplified as the installation angle of the projector 1, however, the installation angle of the projector 1 may be an angle in consideration of the angle of the YD-axis relative to the Y-axis and the angle of the ZD-axis relative to the Z-axis. In the case of the configuration, the first angle information generation part 1131 generates the first angle information representing the installation angle of the first projector based on the angular velocities around the respective three axes. Further, in the case of the configuration, the second angle information generation part 1141 generates the second angle information representing the installation angle of the second projector based on the angular velocities around the respective three axes. Furthermore, in the case of the configuration, the second image generation part 1143 generates the first guide image GD1 showing the difference between the installation angle of the first projector based on the angular velocities around the three axes and the installation angle of the second projector based on the angular velocities around the three axes.

In the above described respective embodiments, the case where the user manually adjust the installation angle of the projector 1 is exemplified, however, the projector 1 may automatically adjust the installation angle according to an instruction by the remote 3 or the like. When automatically adjusting the installation angle, the projector 1 has a function of rotating the image G displayed on the screen SC.

In the above described respective embodiments, image display on the screen SC is exemplified as the form for reporting the information representing the difference between the installation angle of the first projector and the installation angle of the second projector. However, the form for reporting the information representing the difference is not limited to the image display, but may be e.g. sound output. In the case of sound output, the processor 110 functions as a sound output control unit controlling the sound processing unit 16 to output the difference between the installation angle of the first projector and the installation angle of the second projector.

Further, the function of the processor 110 may be realized by a plurality of processors or a semiconductor chip.

The respective functional units shown in FIG. 2 show the functional configurations and do not limit the specific mounting forms. For example, in the projector 1, hardware individually corresponding to the respective functional units is not necessarily mounted. Obviously, the functions of the plurality of functional units can be realized by execution of programs by a single processor. In the above described respective embodiments, part of the functions realized by software may be realized by hardware or part of the functions realized by hardware may be realized by software. In addition, the specific detailed configurations of the other respective parts of the projectors 1 can be arbitrarily changed without departing from the scope of the present disclosure.

For example, the units of steps of the operation shown in FIG. 6 are formed by division according to the details of main processing to facilitate understanding of the operation of the projection system 1000, and the present disclosure is not limited by the way of division and the names of the units of processing. The processing may be divided in more units of steps according to the details of processing. Alternatively, the processing may be divided so that a single unit of step may contain more pieces of processing. Alternatively, the order of the steps may be appropriately exchanged without departing from the scope of the present disclosure.

The display method by the projection system 1000 may be realized by the processor 110 of the projector 1 executing the program corresponding to the display method. Further, the program can be recorded in a recording medium readable by the processor 110. As the recording medium, a magnetic optical recording medium or a semiconductor memory device may be used. The recording medium may be a memory provided in the projector 1. Alternatively, the program corresponding to the display method by the projection system 1000 is stored in a server device and the program is downloaded from the server device to the projector 1, and thereby, the display method by the projection system 1000 may be realized.

The projector 1 is exemplified as the display apparatus, however, the display apparatus is not limited to the projector 1, but includes a self-emitting display apparatus such as a monitor or a liquid crystal television e.g. a liquid crystal display apparatus displaying images on a liquid crystal display panel and a display apparatus displaying images on an organic EL panel, and further includes other various display apparatuses.

What is claimed is:

1. A display method comprising:
generating first angle information representing an installation angle of a first display apparatus based on a detection value of a sensor provided in the first display apparatus, the first display apparatus configured to project a first image on a screen, the installation angle of the first display apparatus being an angle between a direction along which a plurality of display apparatuses is installed and a detection axis of the sensor provided in the first display apparatus;
generating second angle information representing an installation angle of a second display apparatus based on a detection value of a sensor provided in the second display apparatus, the second display apparatus configured to project a second image that superimposes a portion of the first image on the screen, the installation angle of the second display apparatus being an angle between the direction along which the plurality of display apparatuses is installed and a detection axis of the sensor provided in the second display apparatus; and
reporting information representing a difference between the installation angle of the first display apparatus represented by the first angle information and the installation angle of the second display apparatus represented by the second angle information by the second display apparatus, wherein
the reporting is displaying a first guide image, by the second display apparatus, for guiding adjustment of the installation angle of the second display apparatus,
the first guide image shows the difference,
the first guide image contains a first line segment and a second line segment,
the first line segment shows the installation angle of the first display apparatus, and
the second line segment tilts by an angle corresponding to the difference from the first line segment.

2. The display method according to claim 1, wherein the first guide image contains a numerical value showing the difference.

3. The display method according to claim 2, wherein a color of the numerical value changes according to the difference.

4. The display method according to claim 1, wherein a color of the second line segment changes according to the difference.

5. The display method according to claim 1, wherein the first guide image contains a second line segment, and a color of the second line segment changes according to the difference.

6. A display method comprising:
generating first angle information representing an installation angle of a first display apparatus based on a detection value of a sensor provided in the first display apparatus, the first display apparatus configured to project a first image on a screen, the installation angle of the first display apparatus being an angle between a direction along which a plurality of display apparatuses is installed and a detection axis of the sensor provided in the first display apparatus;
generating second angle information representing an installation angle of a second display apparatus based on a detection value of a sensor provided in the second display apparatus, the second display apparatus configured to project a second image that superimposes a portion of the first image on the screen, the installation angle of the second display apparatus being an angle between the direction along which the plurality of display apparatuses is installed and a detection axis of the sensor provided in the second display apparatus; and
reporting information representing a difference between the installation angle of the first display apparatus represented by the first angle information and the installation angle of the second display apparatus represented by the second angle information by the second display apparatus, wherein
the reporting is displaying a first guide image, by the second display apparatus, for guiding adjustment of the installation angle of the second display apparatus,
the first guide image shows the difference,
the first guide image contains a first line segment,
the first line segment shows the installation angle of the first display apparatus, and
a color of the first line segment changes according to the difference.

7. The display method according to claim 1, further comprising displaying a second guide image, by the first display apparatus, for guiding adjustment of the installation angle of the second display apparatus, wherein
the second guide image contains a third line segment, and
the third line segment shows a reference for the installation angle of the second display apparatus.

8. A display system including a plurality of display apparatuses comprising:
a first display apparatus configured to project a first image on a screen; and
a second display apparatus configured to project a second image that superimposes a portion of the first image on the screen, wherein
the first display apparatus generates first angle information representing an installation angle of the first display apparatus based on a detection value of a sensor provided in the first display apparatus, the installation angle of the first display apparatus being an angle between a direction along which the plurality of display apparatuses is installed and a detection axis of the sensor provided in the first display apparatus,
the second display apparatus generates second angle information representing an installation angle of the second display apparatus based on a detection value of a sensor provided in the second display apparatus, the installation angle of the second display apparatus being an angle between the direction along which the plurality of display apparatuses is installed and a detection axis of the sensor provided in the second display apparatus, and
the second display apparatus reports information representing a difference between the installation angle of the first display apparatus represented by the first angle information acquired from the first display apparatus and the installation angle of the second display apparatus represented by the second angle information, wherein
the second display apparatus displays a first guide image for guiding adjustment of the installation angle of the second display apparatus,
the first guide image shows the difference,
the first guide image contains a first line segment and a second line segment,
the first line segment shows the installation angle of the first display apparatus, and
the second line segment tilts by an angle corresponding to the difference from the first line segment.

* * * * *